(12) United States Patent
Welch

(10) Patent No.: US 6,505,721 B1
(45) Date of Patent: Jan. 14, 2003

(54) PLANAR ONE-WAY CLUTCH

(75) Inventor: Sean M. Welch, Frankenmuth, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 09/578,762

(22) Filed: May 25, 2000

(51) Int. Cl.$^7$ ............................................. F16D 41/061
(52) U.S. Cl. ...................... 192/46; 192/45.1; 192/69.1
(58) Field of Search ...................... 192/46, 45.1, 69.1

(56) References Cited

U.S. PATENT DOCUMENTS

| 3,721,325 A | 3/1973 | Richmond |
| 5,070,978 A | 12/1991 | Pires |
| 5,085,305 A | 2/1992 | Cheng |
| 5,449,057 A | 9/1995 | Frank |
| 5,597,057 A | 1/1997 | Ruth et al. |
| 5,690,202 A | 11/1997 | Myers |
| 5,699,889 A | 12/1997 | Gadd |
| 5,829,565 A | 11/1998 | Fergle et al. |
| 5,852,932 A | 12/1998 | Matsumoto |
| 5,855,263 A | 1/1999 | Fergle |
| 5,871,071 A | 2/1999 | Sink |
| 5,918,715 A | * 7/1999 | Ruth et al. ..................... 192/46 |
| 5,927,455 A | * 7/1999 | Baker et al. ............... 192/46 X |
| 5,964,331 A | * 10/1999 | Reed et al. .................... 192/46 |
| 6,065,576 A | * 5/2000 | Shaw et al. .................... 192/46 |
| 6,125,979 A | * 10/2000 | Costin et al. ................ 192/46 |
| 6,244,965 B1 | * 6/2001 | Klecker et al. ......... 192/69.1 X |

FOREIGN PATENT DOCUMENTS

JP     11-2303    * 1/1999

* cited by examiner

Primary Examiner—Rodney H. Bonck
(74) Attorney, Agent, or Firm—Brooks & Kushman P.C.

(57) ABSTRACT

The present invention is a planar one-way clutch comprising a first and second plate rotatable about a common axis. The first plate is the driving plate. The second plate is the driven plate. The coupling surfaces of each plate define at least one recess. The recess in the first plate includes a strut receiving portion and a spring receiving portion. At least one strut, pivotable between a first and second position is received in the strut receiving portion of the first plate. At least one spring, having a base and an arm, is received within the spring receiving portion of the first plate. The arm extends from the base and engages the pivotable strut applying a controlled spring force to urge the strut towards the driven plate. The base portion of the spring is shaped to prevent at least circumferential movement of the spring.

23 Claims, 5 Drawing Sheets

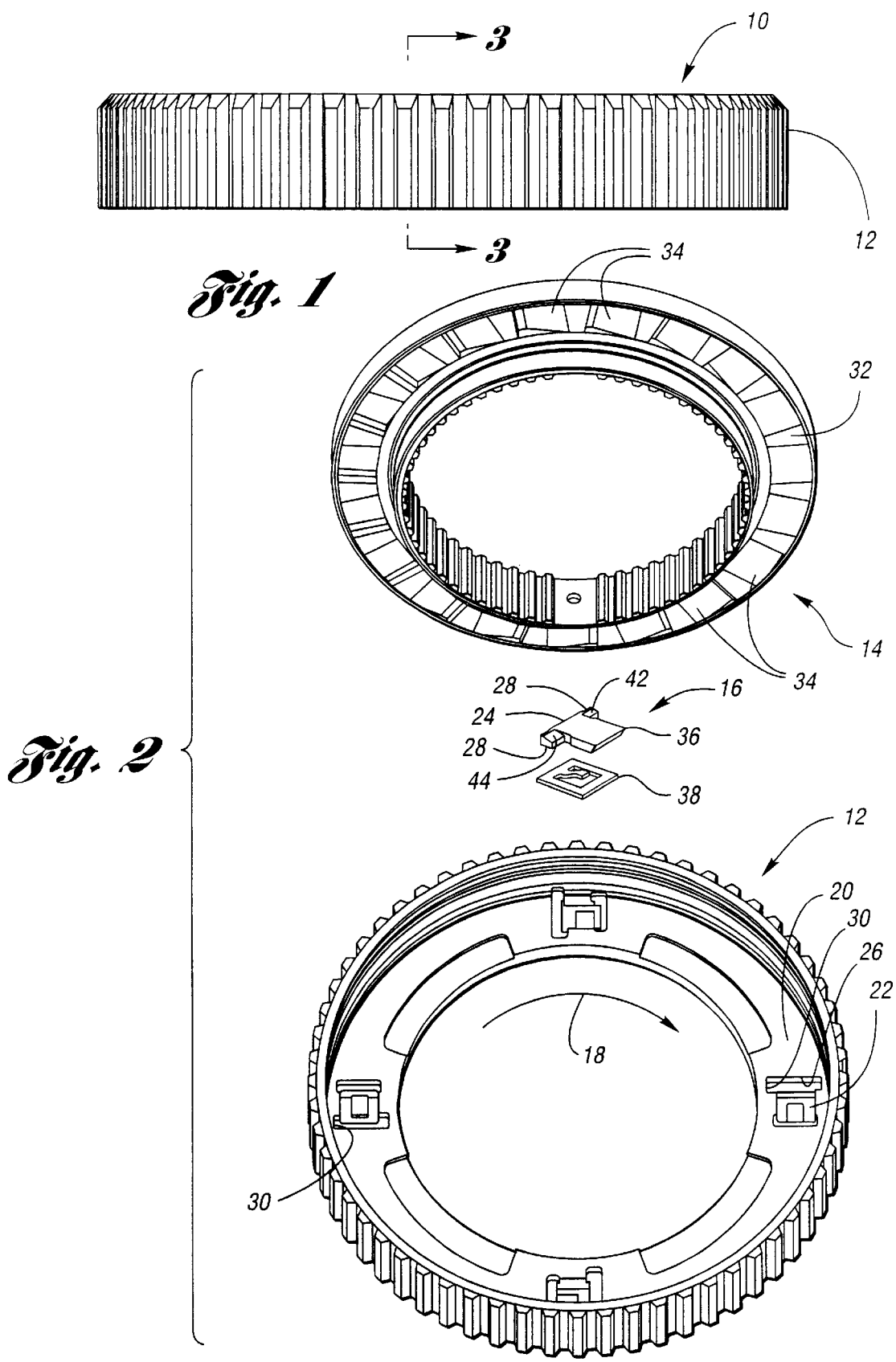

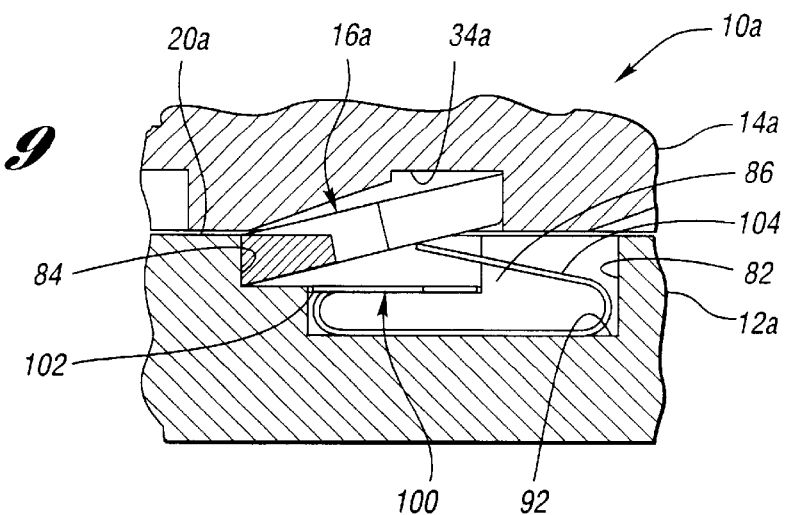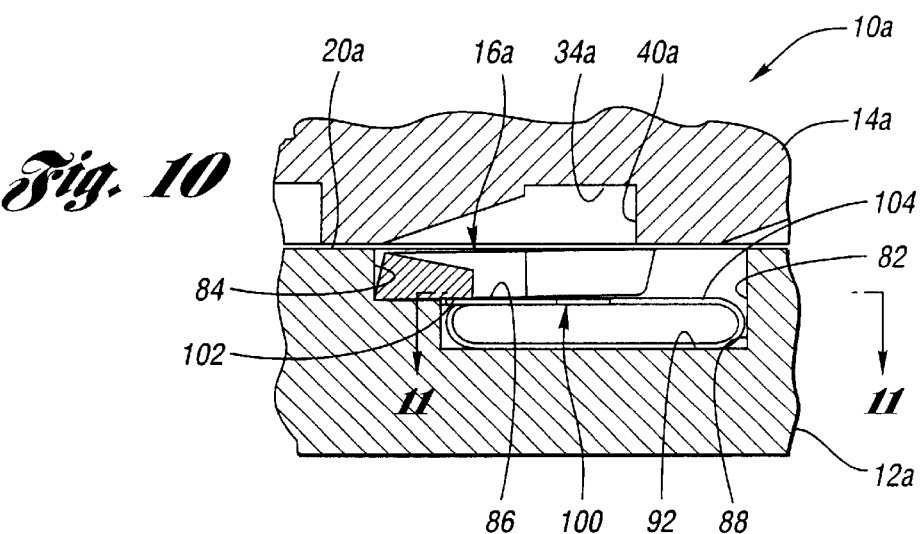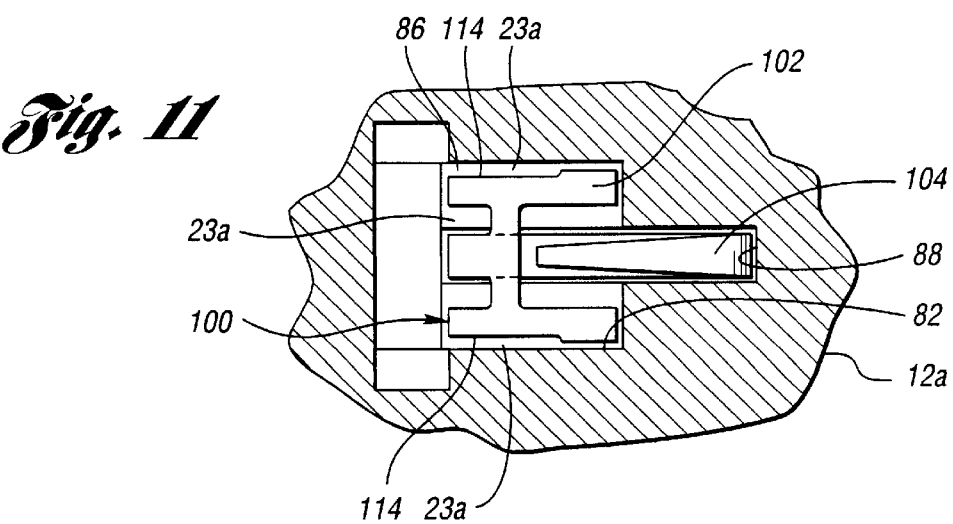

PLANAR ONE-WAY CLUTCH

TECHNICAL FIELD

The invention relates to a planar one-way clutch having a strut urged towards an engaging position by a spring.

BACKGROUND ART

Clutches are used in a wide variety of applications to selectively couple power from a first rotatable "driving" member, such as a driving disk or plate, to a second, independently-rotatable "driven" member, such as a driven disk or plate. In one known variety of clutches, commonly referred to as "one-way" or "overrunning" clutches, the clutch "engages" to mechanically couple the driving member to the driven member only when the driving member seeks to rotate in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "freewheeling" of the driving member in the second direction relative to the driven member is also known as the "overrunning" condition.

One such known one-way clutch employs juxtaposed, nominally-coaxial driving and driven members featuring generally planar clutch faces in closely-spaced axial opposition. Such "planar" one-way clutches, as taught by Frank in U.S. Pat. No. 5,449,057 and Ruth et al. in U.S. Pat. No. 5,597,057, typically include a plurality of recesses or "pockets" formed in the face of the driving member and at least as many recesses or "notches" formed in the face of the driven member. A thin, flat pawl or strut, whose width is typically significantly less than its length, is carried within each of the driving member's pockets such that a first longitudinal end of each strut may readily engage and bear against a radial shoulder defined by its respective pocket in the driving member. The strut's second, opposite longitudinal end is urged towards and against the face of the driven member, for example, by a spring positioned in the pocket beneath the strut.

When the driving member rotates in the first direction relative to the driven member, the second end of at least one strut engages and thereafter bears against a radial shoulder defined by a notch in the driven member, whereupon the strut is placed in compression and the driven member is coupled for rotation with the driving member. When the driving member rotates in the second direction relative to the driven member, a ramped surface defined by other portions of the driven member's notches urge the second end of each strut back towards the driving member, whereupon the driving member is permitted to freely rotate in the second direction relative to the driven member.

Typically, conventional springs, such as torsion springs, have been disposed under the struts to bias the struts into an engaging position. While these conventional springs have, for the most part, functioned in an acceptable manner, they have been somewhat susceptible to unwanted movement, especially radial and circumferential. Also, the types of spring that have been used in the past have necessitated relatively complex geometries in the driving member's pockets, adding significant costs to the clutches. In addition to the above issues, these conventionally used springs have required significant care and costs to ensure proper assembly. Another possible disadvantage with the conventional springs is that they are relatively large, necessitating that the plate recesses that accommodate them be large. This may result in a possible diminishing of the part strength.

It would be desirable to provide a spring for use with one-way planar clutches which overcomes the above and other disadvantages with the conventionally used springs.

DISCLOSURE OF INVENTION

It is an object of the present invention to provide a one-way planar clutch, and a spring for use with the clutch, which overcomes the above discussed disadvantages in the prior art.

For carrying out the above, and other objects, the present invention provides a planar one-way clutch comprising a first plate and a second plate in close juxtaposed relationship with the first plate. Each plate is rotatable about a common axis. One of the plates is a driving plate and the other plate is a driven plate. Each plate has a coupling face and surfaces that define at least one recess in each respective coupling face. The recess in the first plate includes a strut receiving portion and a spring receiving portion.

At least one torque-transmitting strut is received within the strut receiving portion of the recess of the first plate. The strut is pivotable between a first position and a second position. The strut has a first end surface which is spaced from the surfaces defining the recess in second plate when the strut is in the first position. The first end surface of the strut engages at least one of the surfaces that defines the recess in the second plate when the strut is in the second position.

At least one spring is received within the spring receiving portion of the recess of the first plate. The spring has a base and an arm. The arm extends from the base and has a strut engaging portion which engages the strut and applies a controlled spring force on the strut to urge the strut toward the second position. The base of the spring is shaped so that portions of at least two diametrical surfaces are in engagement with the portions of diametrically opposed surfaces that define portions of the spring receiving portion of the recess of the first plate so that the spring base is in interference with a portion of the recess to prevent radial and circumferential movement of the spring relative to the spring receiving portion of the recess of the first plate. Preferably, the spring receiving portion of the recess in the first plate has a rectangular shape. Preferably, the recess is spaced axially in a plane which is below the strut.

In accordance with a feature of the present invention, the spring has a rectangular base that is defined by four segments. The base of the spring preferably includes an outer peripheral surface which continuously engages surfaces that define at least a portion of the spring receiving portion of the recess of the first plate to prevent rotational and lateral movement of the spring relative to the spring receiving portion of the recess of the first plate.

In accordance with another feature of the present invention, the base of the spring is defined by a pair of parallel legs and a single connector leg which extends essentially perpendicularly to the parallel legs and which connects the parallel legs. The base of the spring includes an outer surface which engages surfaces that define at least a portion of the spring receiving portion of the recess of the first plate to prevent rotational and lateral movement of the spring relative to the spring receiving portion of the recess of the first plate.

In accordance with yet another feature of the present invention, the base of the spring includes a pair of tabs, each of which extends laterally away from one of the parallel legs of the base of the spring. The tabs are bendable in an upward direction from the base and are able to be wrapped around a portion of the strut so that the tabs overly at least a portion of an upper side of the strut to secure the strut to the spring.

Although preferred embodiments of the invention are described and illustrated, the embodiments are not exclusive. Various modifications of the invention may be made without departing from the scope of the invention.

BRIEF DESCRIPTION OF DRAWINGS

FIG. 1 is a side elevational view of exemplary planar one-way clutch incorporating springs in accordance with a firs embodiment of the invention;

FIG. 2 is an exploded view of the clutch of FIG. 1;

FIG. 9 is a view similar to FIG. 4 illustrating a second embodiment of the invention;

FIG. 10 is a view similar to FIG. 5 illustrating a second embodiment of the invention;

FIG. 11 is a cross-sectional view of the exemplary clutch of FIG. 10 taken along line 11—11 with the strut removed for clarity;

BEST MODE FOR CARRYING OUT THE INVENTION

Figure 3:
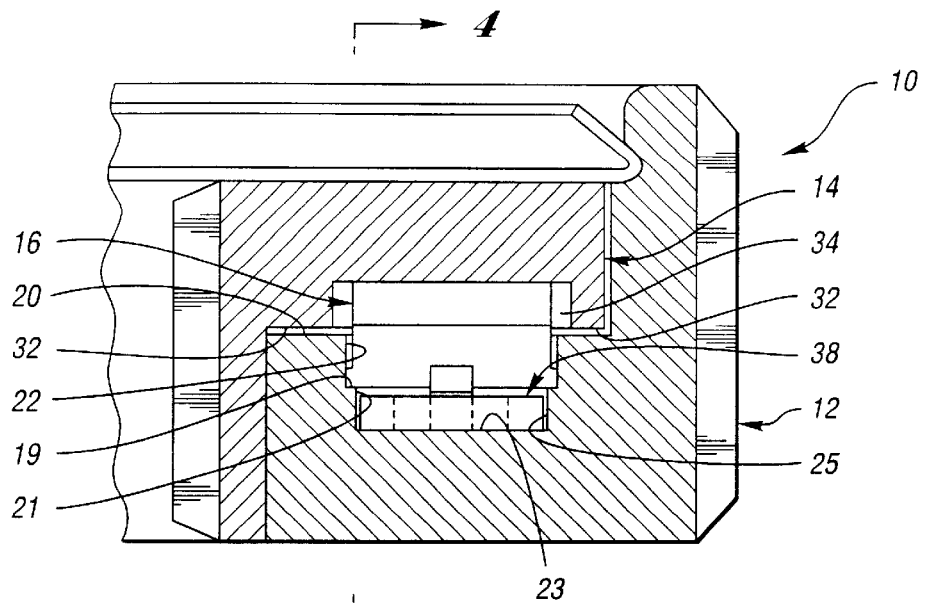
FIG. 3 is a sectional view of the exemplary clutch along line 3—3 of FIG. 1 illustrating a strut in its "engaged" or "coupled" condition.

Referring to the drawings, FIGS. 1–5 show a planar one-way clutch 10 according to a first embodiment of the present invention. The clutch 10 includes a driving member, or plate 12, a driven member, or plate 14, and a plurality of struts 16 which operate to mechanically couple the driving plate 12 to the driven plate 14 only when the driving plate 12 rotates in a first direction 18 relative to the driven plate 14.

Figure 4:
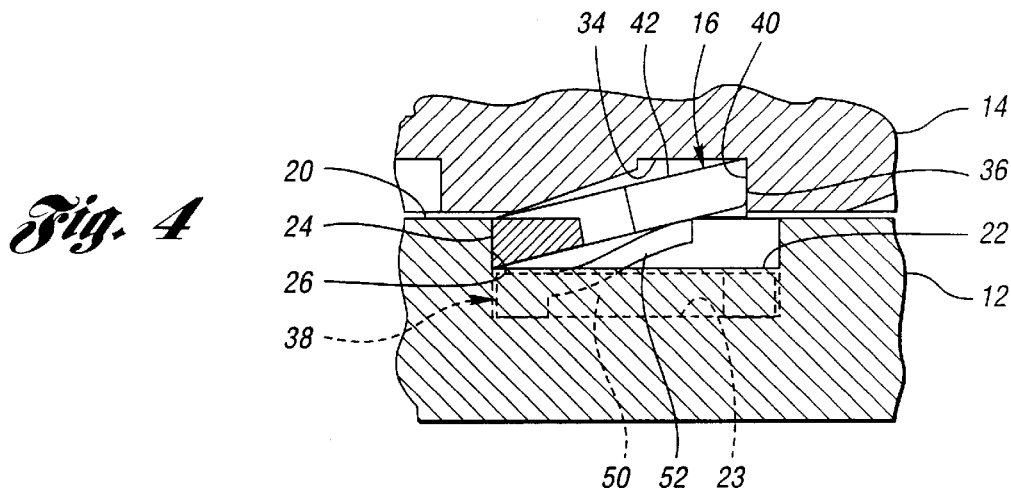
FIG. 4 is a sectional view of the exemplary clutch along line 4—4 of FIG. 3.
Figure 5:
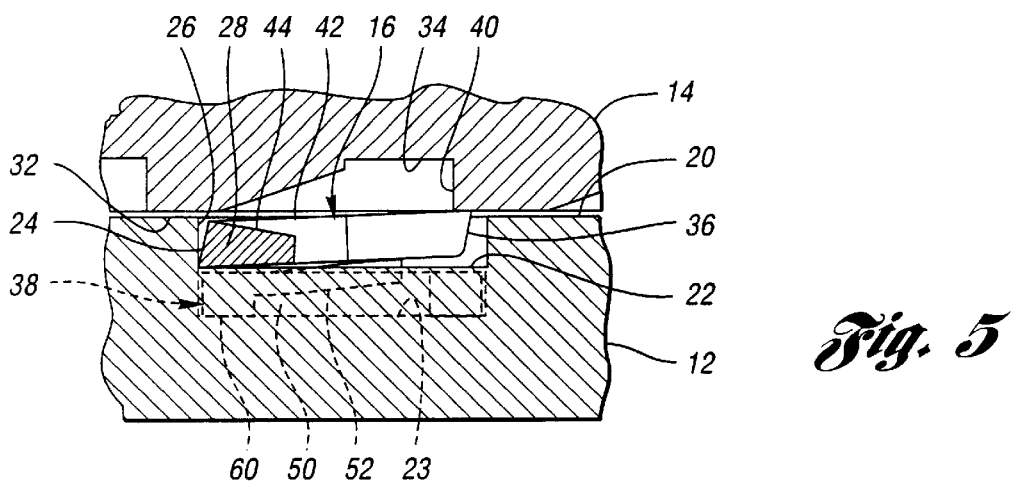
FIG. 5 is a sectional view of the exemplary clutch similar to that shown in FIG. 4, but illustrating the strut in the "free-wheeling" or "overrunning" condition.

More specifically, the driving plate 12 includes a generally planar clutch face 20 having a plurality of pockets or recesses 22 defined therein by a plurality of surfaces. As best shown in FIGS. 3–5, each recess 22 includes a plurality of surfaces that define a strut receiving portion 19 and a plurality of surfaces that define a spring receiving portion 21. The strut receiving portion 19 and the spring receiving portion 21 of the recess 22 each have an essentially rectangular shape. The spring receiving portion 21 has a planar, rectangular-shaped, base receiving surface 23. The spring receiving portion 21 of the recess 22 also includes four side surfaces 25 that extend between the base surface 23 and the strut receiving portion 19 of the recess 22. The strut receiving portion 19 of the recess 22 is greater in width and radial circumference than the spring receiving portion 21. Each strut receiving portion 19 is adapted to receive and nominally retain a given strut 16 such that a first end surface 24 on the strut 16 is placed in opposition with, and will thereafter operatively engage, a radial shoulder 26 defined in the strut receiving portion 19 of the recess 22 when the driving plate 12 is rotated in the first direction 18.

While this embodiment of the present invention contemplates use of any suitable arrangement whereby each strut's first end surface 24 is nominally positioned adjacent the radial shoulder 26 of a given strut receiving portion of a recess 22, in the illustrated clutch 10 of the first embodiment, each strut 16 includes a pair of oppositely-projecting ears 28 which extend laterally from the strut 16 proximate to its first end surface 24. Each strut's ears 28 cooperatively engage the recess' complementary radially-inner and radially-outer surfaces 30 to thereby nominally position the first end 24 of the strut 16 in its respective strut receiving portion 19 of a given recess 22.

The driven plate 14 similarly includes a generally planar clutch face 32 which is placed in closely-spaced axial opposition to the face 20 of the driving plate 12. The driven plate's clutch face 32 likewise has a plurality of notches or recesses 34 defined therein. Each of the recesses 34 in the driven plate 14 is adapted to receive the free end of a given strut 16 when the strut's free end is urged into the recess 34, for example, by a tabular spring 38 seated beneath the strut 16 in the driving plate's recess' spring receiving portion 22b. Each recess 34 is defined by a plurality of surfaces, one of which is an engagement surface 40 with which to operatively engage a second end surface 36 on the strut 16 when the driving plate 12 is rotated in the first direction 18 relative to the driven plate 14.

The strut's first and second plate-engaging end surfaces 24,36 of the strut 16 shown in FIGS. 1–5, each include substantially planar sections which are canted relative to an upper face 42 of the strut 16. The substantially planar sections of the strut's first and second end surfaces 24,36 are themselves substantially parallel to one another. In the exemplary clutch illustrated in the Drawings, the first and second end surfaces 24,36 are canted to a nominal angle of about 16 degrees relative to the strut's upper face 42.

Preferably, a ramped surface 44 is formed on each ear 28 to obviate any possible interference between the ears 28 and the opposed clutch face 32 of the driven plate 14 when the strut 16 otherwise pivots upward to present its second end surface 36 for engagement with the driven plate's clutch face 32. Preferably, a second surface (not shown) of each ear 28 may also be trimmed to form a relief on each ear 28. The formation of reliefs on the ear's second surfaces may help to ensure that the ears 28 do not bear coupling loads when the strut 16 couples the driving plate 12 to the driven plate 14.

Figure 6:
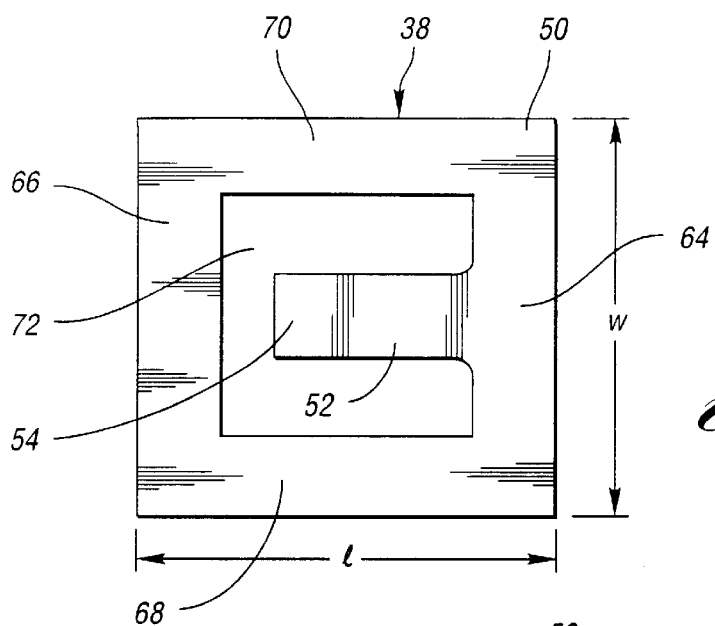
FIG. 6 is a plan view of the spring of exemplary clutch illustrated in FIGS. 1–5.
Figure 7:
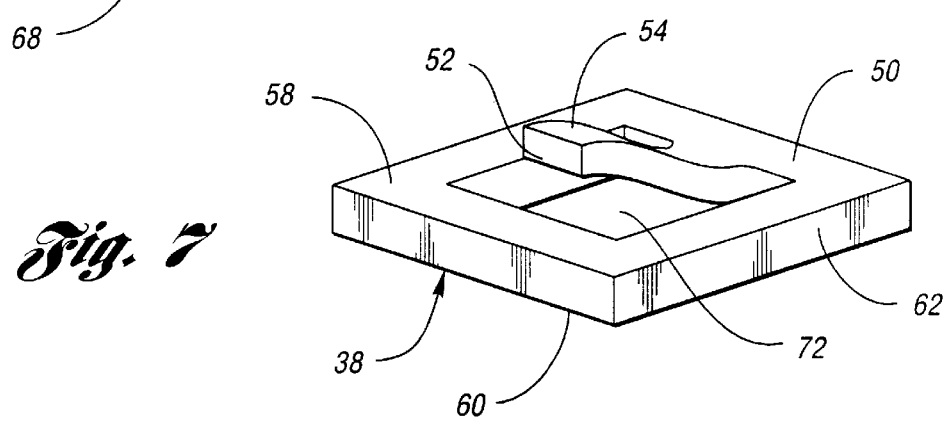
FIG. 7 is a perspective view of the spring of FIG. 6.
Figure 8:
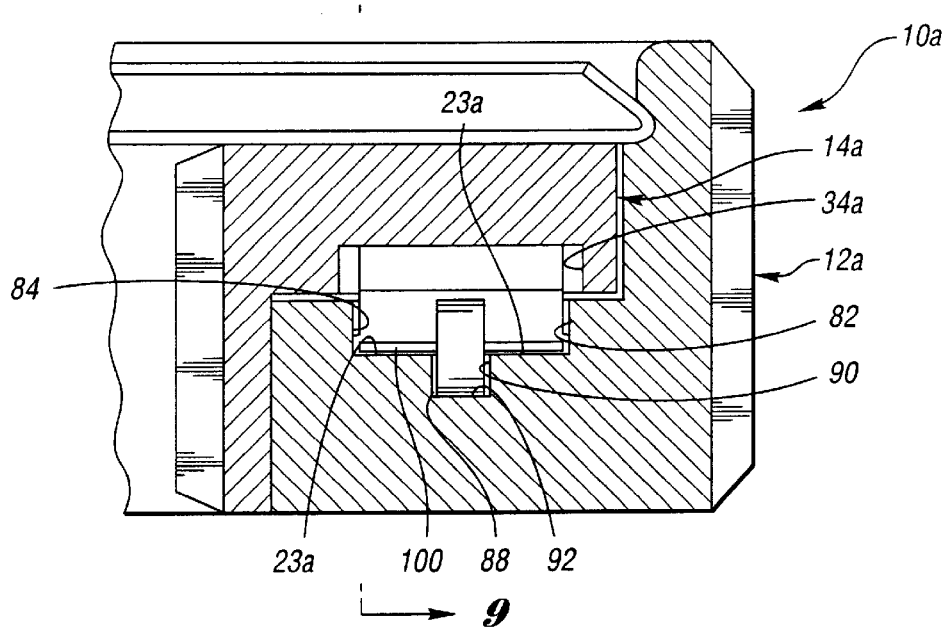
FIG. 8 is a view similar to FIG. 3 illustrating a second embodiment of the invention.

The spring 38 that urges the strut 16 into the recess 34 in the driven plate 14 is shown in greater detail in FIGS. 6–7. The spring 38 includes a base 50 and an arm 52. The arm 52 normally extends from the base 50 at an angle of less than about 40 degrees, and preferably between about 25–35 degrees. The arm 52 of the spring 38 has an essentially planar strut engaging portion 54 that engages the strut 16 and applies a controlled spring force on the strut to urge the strut toward the driven plate 14.

The base 50 is shaped so that at least two diametrical surfaces are in engagement with portions of diametrically opposed surfaces, and in this embodiment, preferably all the surfaces, that define portions of the spring receiving portion 21 of the recess 22 of the driving plate 12. This allows the base 50 of the spring 38 to be in interference with at least a portion of the surfaces that define the spring receiving portion 21 of the recess 22 to prevent radial and circumferential movement of the spring relative to the spring receiving portion 21 of the recess 22.

In the embodiment shown in FIGS. 1–7, the base 50 of the spring 38 is rectangular-shaped to prevent circumferential and radial movement of the spring 38 relative to the spring receiving portion 21 of the recess 22 of the driving plate 12.

The base 50 of the spring 38 includes an upper surface 58, a bottom surface 60 which rests on the base receiving surface 23 of the spring receiving portion 21 of the recess 22, and an outer peripheral surface 62 extending between the upper and bottom surfaces 58 and 60.

The base 50 of the spring 38 has a length l and a width w. Preferably, but not necessarily, the width w is shorter than length l, as shown in the figures. The base 50 of the spring 38 comprises a first segment 64 and a second segment 66, spaced apart and parallel to the first segment. The base 50 of the spring 38 further comprises a third segment 68 and a fourth segment 70, spaced apart and parallel to third segment. The third and fourth segments 68 and 70 extend between and connect the first and second segments 64 and 66. Each segment 64–70 has an outer surface which cooperate to form the outer peripheral surface of the base 50. Each segment 64–70 also has an inner surface which cooperate to form an aperture, or cut-out portion 72 in the base 50.

The base 50, having a rectangular shape, is press fitable into the rectangular-shaped spring receiving portion 21 of the recess in the driving plate 12 with the arm 52 extending towards the driven plate 14. The arm 52 is resilient to allow the strut 16 to selectively pivot between a first position where the second end surface 36 of the strut is spaced from the recess 34 in the driven plate 14 and a second position where the second end surface 36 of the strut 16 is disposed within the recess 34, preferably engaging the engagement surface 40. The resiliency of the arm 52 operates to normally bias the strut 16 towards the driven plate 14.

The spring 38 may be made from any resilient metallic or plastic material. Examples of suitable materials include, but are not limited to, beryllium-copper alloy and spring steel. Preferably the spring is formed by stamping and then formed on a forming die.

FIGS. 8–12 illustrate a second embodiment of the present invention. Since the embodiment illustrated in FIGS. 8–12 is generally similar to the embodiment illustrated in FIGS. 1–7, similar numerals are utilized to designate similar components with the suffix letter "a" being associated with the numerals of the embodiment of FIGS. 8–12 to avoid confusion.

The clutch 10a of the second embodiment includes a driving plate 12a, a driven plate 14a, and a plurality of struts 16a. The driving plate 12a includes a generally planar clutch face 20a having a plurality of recesses 82. Each recess 82 includes a plurality of surfaces that define a strut receiving portion 84, a plurality of surfaces that define a spring base receiving portion 86, and a plurality of surfaces that define a spring arm receiving channel 88. The strut receiving portion 84, the spring base receiving portion 86 and the spring arm receiving channel 88 of the recess 82 each have an essentially rectangular shape. The spring base receiving portion 84 has two planar, essentially rectangular-shaped, base receiving surfaces 23a separated by the spring arm receiving channel 88. Thus, the spring arm receiving channel 88 extends through the spring base receiving portion 84 of the recess 82.

The spring base receiving portion 86 of the recess 82 also includes side surfaces that extend between the base surfaces 23a and the strut receiving portion 84 of the recess 82. The strut receiving portion 84 of the recess 82 is greater in width and radial circumference than the spring base receiving portion 86. The channel 88 has side surfaces 90 which extends between the base surfaces 23a and a base surface 92 of the channel 88. The channel 88 is greater in radial circumference and more narrow in width than the strut and spring base receiving portions 84 and 86 of the recess 82.

Each of the recesses 34a in the driven plate 14a is adapted to receive the free end of a given strut 16a when the strut's free end is urged into the recess 34a by a tabular spring 100 seated in a plane which is beneath the strut 16a in the driving plate's recess 82.

Figure 12:
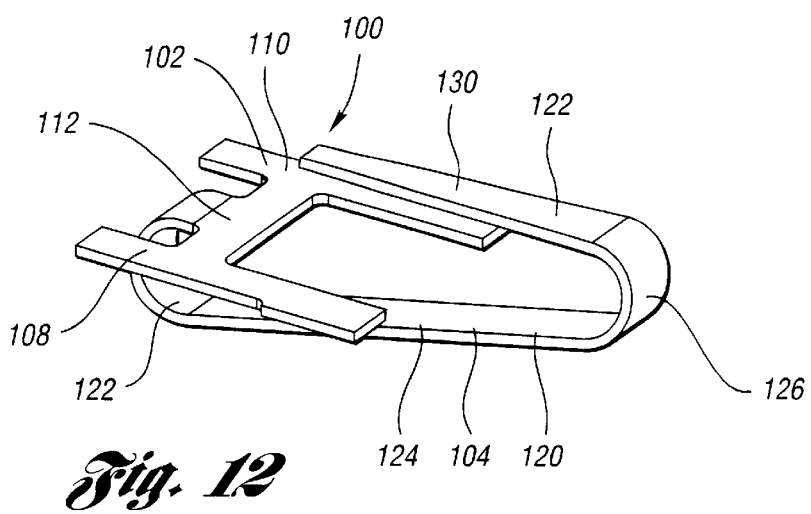
FIG. 12 is a perspective view of the spring illustrated in FIGS. 8–11.

The spring 100 that urges the strut 16a into the recess 34a in the driven plate 14a is shown in greater detail in FIG. 12. The spring 100 includes a base 102 and an arm 104.

The base 102 of the spring 100 is shaped to prevent circumferential and radial movement of the spring 100 relative to the spring base receiving portion 86 of the recess 82 of the driving plate 12a. The base 102, in this embodiment, is preferably rectangular and rests on the base receiving surfaces 23a of tile spring base receiving portion 86 of the recess 82.

The base 102 of the spring 100 has a length and a width, shorter than length. The base 102 of the spring 100 comprises a first leg 108 and a second leg 110, spaced apart and parallel to the first leg. The base 102 of the spring 100 further comprises a third, connector leg 112 that extends between and connect the first and second legs 108 and 110. This type of configuration enables a relatively easy press-fit insertion of the spring 100 into the spring base receiving portion 86 of the recess 82. The first and second legs 108 and 110 each have an outer surface 114 that engages surfaces that define a portion of the spring base receiving portion 86 of the recess 82 of the driving plate 12a to prevent circumferential and radial movement of the spring 100 relative to the spring base receiving portion 86 of the recess 82.

The arm 104 includes an intermediate portion 120 that extends away and down from the base 102. The intermediate portion 120 has a first curved portion 122 extending downwardly from the base 102, a planar connector portion 124 extending under and past a longitudinal end of the base 102, and a second curved portion 126 extending from the connector portion towards the base 102. The arm 104 also includes an essentially planar strut engaging portion 130 that engages the strut 16a and applies a controlled spring force on the strut to urge the strut toward the driven plate 14a. The strut engaging portion 130 extends from the second curved portion 126 toward the base 102, the strut 16a and the driven plate 14a at an angle, relative to the base 102 of less than about 40 degrees, and preferably between about 25–35 degrees.

The base 102, having a rectangular shape, is press fitable with relative ease into the rectangular-shaped spring base receiving portion 86 of the recess 82 in the driving plate 12a with the strut engaging portion 130 of the arm 104 extending towards the driven plate 14a. The arm 104 is resilient to allow the strut 16a to selectively pivot between a first position where the second end surface 36a of the strut 16a is spaced from the recess 34a in the driven plate 14 and a second position where the second end surface 36a of the strut 16a is disposed within the recess 34a, preferably engaging the engagement surface 40a. The resiliency of the arm 104 operates to normally bias the strut 16a towards the driven plate 14a. Because the arm 104 extends past a longitudinal end of the base 102 as well as the strut receiving portion 84 of the recess 82, the spring is less susceptible to stresses. Having two curved portions 122 and 126 also significantly contributes to reducing stresses.

The spring 100 may be made from any resilient metallic material. Examples of suitable materials include, but are not limited to, beryllium-copper alloy and spring steel. Preferably the spring 100 is formed by stamping and then formed on a forming die.

Figure 13:
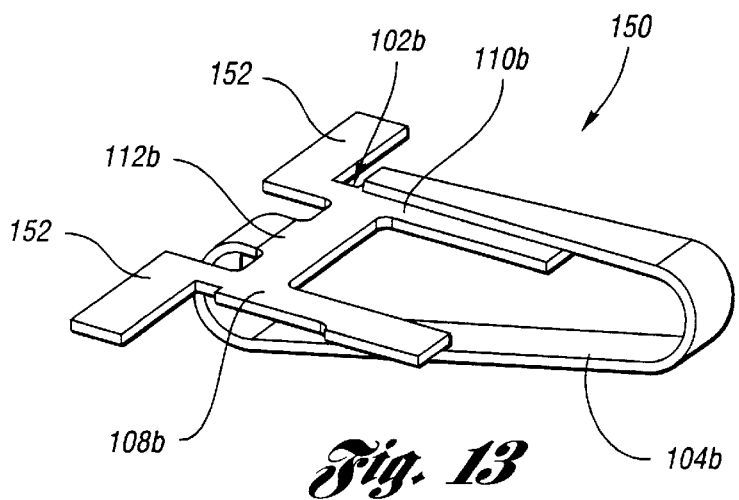
FIG. 13 is a perspective view of a spring in accordance with a third embodiment of the present invention.
Figure 14:
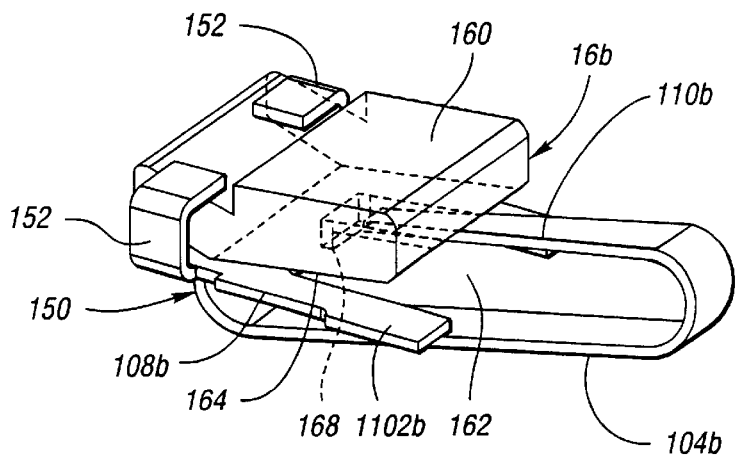
FIG. 14 is a perspective view of the spring in FIG. 13 coupled to an exemplary strut.

FIGS. 13–14 illustrate a third embodiment of the present invention. Since the embodiment illustrated in FIGS. 13–14 is generally similar to the embodiments illustrated in FIGS. 1–13, similar numerals are utilized to designate similar components with the suffix letter "b" being associated with the numerals of the embodiment of FIGS. 13–14 to avoid confusion.

A spring 150 is illustrated in FIGS. 13–14. The spring 150 is essentially identical to spring 100 in the second embodiment except that it has two tabs 152 that extend laterally away from legs 108b and 110b of base 102b. The tabs 152 extend essentially parallel to the connector arm 112b of the base 102b. A preferred strut 16b for use in the third embodiment of the present invention is shown in FIG. 14. The strut 16b is essentially identical to struts 16 and 16a except that strut 16b does not have ears 28. Strut 16b has an upper face 160, a bottom face 162, and a peripheral surface 164 extending between the upper and bottom faces. The tabs 152, as best shown in FIG. 14 are bendable in a direction towards the strut 16b so that the tabs, when bent around the strut 16b, overlies and engage a portion of the strut's upper face 160 to retain an end of the strut within the recess of the driving plate. A stop 168 extends perpendicularly from the bottom face 162 of the strut 16b. The distal end of the arm 104b abuts the stop 168 to inhibit forward movement of the strut 16b.

While embodiments of the invention have been disclosed, it is not intended that the disclosure illustrates and describes all modifications and all alternative designs and equivalents that fall within the scope of the following claims. For instance, it should be readily understood that the shapes of the spring base and the recesses are not limited to those described above. Any suitable shapes could be employed provided a suitable interference fit is achieved. Also, it is contemplated that the struts described and illustrated are not the only struts useable with the present invention.

What is claimed is:

1. A planar one-way clutch comprising:

a first plate;

a second plate in close juxtaposed relationship with the first plate, each plate being rotatable about a common axis, one of the first and second plates being a driving plate and the other of the first and second plates being a driven plate, each plate having a coupling face and surfaces defining at least one recess in each of the respective coupling faces the recess in the first plate having a strut receiving portion and a spring receiving portion, the spring receiving portion including opposed circumferential surfaces;

at least one torque-transmitting strut received within the strut receiving portion of the recess of the first plate, the strut being pivotable between a first position and a second position, the strut having an end surface which is spaced from the recess in the second plate when the strut is in the first position, the end surface of the strut disposed within the recess in the second plate when the strut is in the second position; and at least one spring received within the spring receiving portion of the recess of the first plate, the spring having a base and an arm, the arm extends from the base and has a strut engaging portion which engages the strut and applies a controlled spring force on the strut to urge the strut toward the second position, the base defining at least two diametrically-opposed surfaces that are in close-spaced opposition with the circumferential surfaces of the first plate to prevent at least circumferential movement of the spring relative to the spring receiving portion of the recess of the first plate.

2. The one-way clutch of claim 1, wherein the strut engaging portion of the spring comprises only one arm.

3. The one-way clutch of claim 1, wherein the arm portion of the spring extends past a longitudinal end of the base of the spring.

4. The one-way clutch of claim 1, wherein the base of the spring has a length and a width, the length of the base being greater than the width of the base.

5. The one-way clutch of claim 1 wherein the diametrically-opposed surfaces of the base are coplanar relative to the axis.

6. The one-way clutch of claim 1 wherein the diametrically-opposed surfaces of the base simultaneously engage the circumferential surfaces of the recess of the first plate.

7. The one-way clutch of claim 6 wherein the base defines two portions that have diametrically-opposed surfaces that engage opposed circumferential surfaces of the spring receiving portion of the recess of the first plate.

8. The one-way clutch of claim 1 wherein the base comprises a first member, a second member, and a third member, the first and second members being spaced from each other and the third member extending between the first and second members along a substantially continuous plane.

9. The one-way clutch of claim 1 wherein the base is substantially planar.

10. A planar one-way clutch comprising:

a first plate;

a second plate in close juxtaposed relationship with the first plate, each plate being rotatable about a common axis, one of the first and second plates being a driving plate and the other of the first and second plates being a driven plate, each plate having a coupling face and surfaces defining at least one recess in each of the respective coupling faces, the recess in the first plate having a strut receiving portion and a spring receiving portion;

at least one torque-transmitting strut received within the strut receiving portion of the recess of the first plate, the strut being pivotable between a first position and a second position, the strut having an end surface which is spaced from the recess in the second plate when the strut is in the first position, the end surface of the strut disposed within the recess in the second plate when the strut is in the second position; and at least one spring received within the spring receiving portion of the recess of the first plate, the spring having a base and an arm, wherein the base has opposed circumferential portions and the arm extends from the base from between the circumferential portions of the base and has a strut engaging portion which engages the strut and applies a controlled spring force on the strut to urge the strut toward the second position;

wherein the strut engaging portion of the spring extends away from the base at a nominal angle of less than about 40 degrees when the strut is in the second position.

11. The one-way clutch of claim 10, wherein the strut engaging portion of the spring extends away from the base of the spring at a nominal angle of between about 25–35 degrees when the strut is in the second position.

12. A planar one-way clutch comprising:

a first plate;

a second plate in close juxtaposed relationship with the first plate, each plate being rotatable about a common axis, one of the first and second plates being a driving plate and the other of the first and second plates being a driven plate, each plate having a coupling face and surfaces defining at least one recess in each of the respective coupling faces, the recess in the first plate having a strut receiving portion and a spring receiving portion;

at least one torque-transmitting strut received within the strut receiving portion of the recess of the first plate, the strut being pivotable between a first position and a second position, the strut having an end surface which is spaced from the recess in the second plate when the strut is in the first position, the end surface of the strut disposed within the recess in the second plate when the strut is in the second position; and at least one spring received within the spring receiving portion of the recess of the first plate, the spring having a base and an arm, wherein the arm extends from the base and has a strut engaging portion which engages the strut and applies a controlled spring force on the strut to urge the strut toward the second position;

wherein the arm of the spring having portions which extend below and above the base of the spring.

13. The one-way clutch member of claim 12, wherein the portion of the arm that extends below the base comprises an intermediate portion which connects the base and the strut engaging portion of the spring.

14. The one-way clutch of claim 13, wherein the intermediate portion of the arm includes at least two curved section.

15. The one-way clutch of claim 14, wherein the strut engaging portion of the spring is essentially planar.

16. The one-way clutch of claim 14, wherein the spring receiving portion of the recess in the first plate has two base-engaging surfaces separated by a channel with at least a portion of the intermediate portion being disposed within the channel.

17. A planar one-way clutch comprising:

a first plate;

a second plate in close juxtaposed relationship with the first plate, each plate being rotatable about a common axis, one of the first and second plates being a driving plate and the other of the first and second plates being a driven plate, each plate having a coupling face and surfaces defining at least one recess in each of the respective coupling faces, the recess in the first plate having a strut receiving portion and a spring receiving portion;

at least one torque-transmitting strut received within the strut receiving portion of the recess of the first plate, the strut being pivotable between a first position and a second position, the strut having an end surface which is spaced from the recess in the second plate when the strut is in the first position, the end surface of the strut disposed within the recess in the second plate when the strut is in the second position; and at least one spring received within the spring receiving portion of the recess of the first plate, the spring having a base and an arm, the arm extends from the base and has a strut engaging portion which engages the strut and applies a controlled spring force on the strut to urge the strut toward the second position;

wherein the spring receiving portion of the recess in the first plate includes an essentially continuous base engaging surface which has essentially the same shape as the base of the spring; and wherein the base of the spring includes an outer peripheral surface that engages surfaces that define at least a portion of the spring receiving portion of the recess of the first plate to prevent circumferential and radial movement of the spring relative to the spring receiving portion of the recess of the first plate.

18. The one-way clutch of claim 17, wherein the spring receiving portion of the recess of the first plate has two base engaging surfaces separated by a channel.

19. A planar one-way clutch comprising:

a first plate;

a second plate in close juxtaposed relationship with the first plate, each plate being rotatable about a common axis, one of the first and second plates being a driving plate and the other of the first and second plates being a driven plate, each plate having a coupling face and surfaces defining at least one recess in each of the respective coupling faces, the recess in the first plate having a strut receiving portion and a spring receiving portion;

at least one torque-transmitting strut received within the strut receiving portion of the recess of the first plate, the strut being pivotable between a first position and a second position, the strut having an end surface which is spaced from the recess in the second plate when the strut is in the first position, the end surface of the strut disposed within the recess in the second plate when the strut is in the second position; and at least one spring received within the spring receiving portion of the recess of the first plate, the spring having a base and an arm, the arm extends from the base and has a strut engaging portion which engages the strut and applies a controlled spring force on the strut to urge the strut toward the second position;

wherein the base of the spring is defined by four segment members that define a rectangle.

20. A planar one-way clutch comprising:

a first plate;

a second plate in close juxtaposed relationship with the first plate, each plate being rotatable about a common axis, one of the first and second plates being a driving plate and the other of the first and second plates being a driven plate, each plate having a coupling face and surfaces defining at least one recess in each of the respective coupling faces, the recess in the first plate having a strut receiving portion and a spring receiving portion;

at least one torque-transmitting strut received within the strut receiving portion of the recess of the first plate, the strut being pivotable between a first position and a second position, the strut having an end surface which is spaced from the recess in the second plate when the strut is in the first position, the end surface of the strut disposed within the recess in the second plate when the strut is in the second position; and at least one spring received within the spring receiving portion of the recess of the first plate, the spring having a base and an arm, the arm extends from the base and has a strut engaging portion which engages the strut and applies a controlled spring force on the strut to urge the strut toward the second position;

wherein the base of the spring is defined by a pair of parallel legs and a single connector leg which extends essentially perpendicularly to the parallel legs.

21. The one-way clutch of claim 20, wherein the base of the spring includes an outer surface which engages surfaces that define at least a portion of the spring receiving portion of the recess of the first plate to prevent rotational and lateral movement of the spring relative to the spring receiving portion of the recess of the first plate.

22. The one-way clutch of claim 21, wherein the base of the spring includes a pair of tab portions, each tab portion extending away from one of the parallel legs of the base of the spring and being essentially parallel with respect to the connector leg of the base of the spring.

23. The one-way clutch of claim 22, wherein the strut has a bottom surface, an upper surface proximate to one end of the strut, and a peripheral surface extending between and connecting the upper and bottom surfaces of the strut, the bottom surface of the strut overlies at least a portion of the parallel legs that define the base of spring, the tabs overlie the upper surface of the strut to retain the end of the strut within the recess of the first plate.

* * * * *

UNITED STATES PATENT AND TRADEMARK OFFICE
CERTIFICATE OF CORRECTION

PATENT NO.    : 6,505,721 B1                                         Page 1 of 1
DATED         : January 24, 2003
INVENTOR(S)   : Sean M. Welch It is certified that error appears in the above-identified patent and that said Letters Patent is hereby corrected as shown below:

Column 9,
Line 45, please delete "section" and replace with -- sections --.

Column 12,
Line 14, after "base of" please insert -- the --.

Signed and Sealed this

Twenty-second Day of April, 2003

JAMES E. ROGAN
*Director of the United States Patent and Trademark Office*